United States Patent

Giersberg et al.

Patent Number: 5,314,534
Date of Patent: May 24, 1994

[54] PREPARATION AND METHOD FOR COATING GLASS VESSELS

[75] Inventors: Joachim Giersberg, Marl-Sinsen; Hartmut Gomm, Mühlheim; Dirk Naumann, Essen-Kupferdreh, all of Fed. Rep. of Germany

[73] Assignee: Th. Goldschmidt AG, Essen, Fed. Rep. of Germany

[21] Appl. No.: 917,255

[22] Filed: Jul. 20, 1992

[30] Foreign Application Priority Data

Jul. 20, 1991 [DE] Fed. Rep. of Germany ....... 4124136

[51] Int. Cl.⁵ ............................................. C09D 1/00
[52] U.S. Cl. ............................ 106/287.19; 106/1.25; 106/286.4
[58] Field of Search ............... 106/1.25, 286.4, 287.19; 423/89, 462

[56] References Cited

U.S. PATENT DOCUMENTS 3,414,429 12/1968 Bruss, Jr. et al.

FOREIGN PATENT DOCUMENTS 2541710 4/1976 Fed. Rep. of Germany.
62-267476 11/1987 Japan .................................. 106/1.25

*Primary Examiner*—David Brunsman
*Attorney, Agent, or Firm*—Anderson Kill Olick & Oshinsky

[57] ABSTRACT

Glass vessels are coated by spraying a solution containing 100 to 1,000 g/L of $(OH)_2SnCl_2$ on the 500° to 600° C. hot outer surface of the glass vessels. The solution may contain oxalic acid and a portion of the $(OH)_2SnCl_2$ compound may be substituted by a compound $(HO)_xSn(C_2O_4)_y$, wherein y is 0.2 to 3.8, y is 1.9 to 0.1 and $(2y+x)=4$. The coatings are uniform.

6 Claims, No Drawings

PREPARATION AND METHOD FOR COATING GLASS VESSELS

FIELD OF THE INVENTION

The invention generally relates to the surface improvement of hollow glass bodies—hereinafter referred to as glass vessels—and is particularly directed to a liquid tin compound comprising a preparation suitable for spraying onto hot glass vessels to form a thin coating thereon.

Considered from another aspect, the invention is concerned with a coating method for applying tin compounds to the exterior surface of a glass vessel to improve its characteristics and the vessel obtained by the method.

More specifically, the invention provides a method for coating glass vessels by spraying a solution of tin compounds in water, alcohol or water/alcohol mixtures on the 500° to 600° C. hot outer surface of the glass vessels.

BACKGROUND INFORMATION AND PRIOR ART

It is known to coat thin tin oxide layers on glass surfaces by exposing the heated glass to a vaporized tin compound. The tin compound may be applied as a vapor or as a fine spray which contains a dissolved tin compound.

For example, U.S. Pat. No. 3,414,429 discloses a method for applying metal oxide layers on glass containers, wherein tin(IV) halides, such as tin tetrachloride, are used as tin compounds. However, these compounds hydrolyse readily in the presence of mere traces of moisture with the formation of highly corrosive compounds. Since only a small portion of the tin halides introduced into the coating chamber is actually deposited on the glass surface and the unused portion of the tin halides cannot be recycled without considerable expenditure, the tin halides have only a limited suitability for coating or surface improving glass. Since tin tetrachloride, when used, is generally stabilized with additional hydrogen chloride, at least four chloride atoms per tin atom are obtained, which contaminate the effluent or waste water in the form of the chlorides. Moreover, because of spontaneous decomposition of tin tetrachloride, it is not unusual that a nonuniform build-up of the tin oxide layer takes place which results in optically confusing interferences.

If tin dichloride is used instead of tin tetrachloride, the amount of chloride to be disposed of is theoretically reduced. However, because of the hydrolytic instability of the aqueous solutions of tin dichloride, also in this instance hydrogen chloride has to be added to these solutions. As a result, the amount of chloride rises again above the value of 1 Sn : 2 Cl. In addition, the problem of the increased corrosion of the equipment by the hydrochloric acid-containing tin dichloride solution remains.

German Patent 25 41 710 discloses a method for applying a tin(IV) oxide layer on a glass container by the pyrolysis of a vaporized or finely divided, liquid tin compound on the surface of glass having a temperature of 450° to 600° C. For this method, a monoorgano tin trichloride of the general formula $RSnCl_3$, wherein R is an alkyl radical with 1 to 8 carbon atoms, is used as tin compound. Preferably, butyl tin trichloride is used as monoalkyl tin trichloride. However, organo tin compounds are toxic products, which must be identified as such and the use of which requires special care. With respect to pollutant emission, it is a disadvantage that three chlorine atoms per tin atom are released and must be disposed of.

The glass containers provided with a tin(IV) oxide layer (hot end coated) can subsequently be additionally provided with a thin film of a natural wax or a synthetic polymer (cold end coating). Such a coating usually is transparent and makes the glass container even more resistant to scratching and abrasion, even when said container comes into contact with alkaline cleaning agents.

OBJECTS OF THE INVENTION

The present invention is concerned with the technical problem of coating the outer surface of glass vessels. A primary object of the invention is to provide solutions of tin compounds which are easily accessible, have a long shelf life and are not toxic or are toxic to a slight extent only. Moreover, it is an object of the invention that upon the thermal decomposition of these compounds on hot glass surfaces, uniform tin oxide layers are formed on which the cold end coating materials (waxes, polyolefins, etc.) adhere well.

It is also an object of the present invention to provide a method for coating and thus surface improving glass vessels.

SUMMARY OF THE INVENTION

It has been ascertained that the objects can be attained by spraying a solution of tin compounds in water, alcohol or water/alcohol mixtures on the 500° C. to 600° C. hot outer surface of the glass vessels, with the distinguishing feature that the solution contains 100 to 1,000 g/L of $(OH)_2SnCl_2$.

Aqueous solutions of $(OH)_2SnCl_2$ can be easily prepared in high concentrations by preferably the electrolytic oxidation of aqueous solutions of tin(II) chloride. The solutions are resistant to hydrolysis. Precipitates are not formed, even after prolonged standing. Thickened, highly concentrated solutions can readily be diluted again to the concentration at which they are to be used. The ratio of Sn to Cl is 1:2, so that the effluent or emission problems can be kept at a relatively low level.

With the inventive method, uniform tin oxide layers with a thickness of up to about 100 nm are obtained on the glass surfaces. During a subsequent cold end coating, the wax or polyolefin layers applied adhere well and withstand a larger number of washing cycles than was possible according to the previous state of the art.

A modification of the inventive method is that a solution is sprayed, which additionally contains 0.01 to 0.5 moles of oxalic acid per mole of $(OH)_2SnCl_2$. Due to the addition of the oxalic acid, the formation of particularly uniform tin oxide layers is promoted and the adhesion of layers on the substrate is improved even more.

It has been ascertained that it is of particular advantage if a solution is sprayed in which up to 50 mole percent of the compound $(OH)_2SnCl_2$ are replaced by equimolar amounts of a compound of the general formula $(HO)_xSn(C_2O_4)_y$, in which x has a value of 0.2 to 3.8, y a value of 1.9 to 0.1 and $(2y+x)=4$. With this particularly preferred embodiment of the inventive method, it is possible, while achieving tin oxide layers of optimum properties, to lower the amount of chloride to be disposed of even further without having to accept disadvantages, such as a reduced hydrolysis stability of the solution. The solutions of $(HO)_xSn(C_2O_4)2_y$, for their part, also exhibit hydrolytic stability and can also be produced in high concentrations by electrolytic means.

Solutions in which the Sn to Cl ratio is at least approximately equal to 1 have proven to be particularly advantageous for carrying out the inventive method.

A further aspect of the invention are the preparations for carrying out the inventive method. Such a preparation is characterized in that it is of a solution which contains the compound $(OH)_2SnCl_2$ in such an amount that the Sn content in the solution is 0.45 to 4.5 moles/L. This corresponds to a concentration of 100 to 1,000 g/L of $(OH)_2SnCl_2$. Moreover, as stated above, up to 50 mole percent of the $(OH)_2SnCl_2$ compound can be replaced by equimolar amounts of the compound of the general formula $(HO)_xSn(C_2O_4)_y$, in which x has a value of 0.2 to 3.8, y a value of 1.9 to 0.1 and $(2y+x)=4$, the ratio of Sn to Cl preferably being at least approximately equal to 1. Furthermore, oxalic acid can be added to the solution in such an amount that the solution additionally contains 0.01 to 0.5 moles of oxalic acid per mole of $(OH)_2SnCl_2$. The addition of oxalic acid is to be recommended particularly when the value of subscript y in the compound $(HO)_xSn(C_2O_4)_y$ lies in the lower range from 0.1 to about 0.5.

The preferred solvent is water. However, mixtures of water and alcohols, particularly lower aliphatic alcohols, such as ethanol as well as ethanol by itself, can also be used as solvent. Examples of inventive preparations are solutions of the following composition:

| Solution | $(OH)_2SnCl_2$ g/L | Oxalic Acid g/L | $(HO)_xSn(C_2O_4)_y$ x = | y = | g/L |
|---|---|---|---|---|---|
| 1 | 450 | — | — | — | — |
| 2 | 645 | — | — | — | — |
| 3 | 323 | 50 | — | — | — |
| 4 | 215 | — | 2 | 1 | 170 |
| 5 | 323 | — | 2 | 1 | 170 |
| 6 | 226 | 100 | 2 | 1 | 167 |
| 7 | 226 | — | 2 | 1 | 167 |

The inventive method is further described in more detail by the following examples, it being understood that these examples are given by way of illustration and not by way of limitation. The procedure for coating the external surface of bottles is shown first and the coatings obtained are examined for the thickness of the layer and for uniformity. The coated bottles are subsequently cold end coated and the resistance to washing of the cold end coatings is determined.

DESCRIPTION OF THE METHOD

Uncoated white glass bottles of a volume capacity of 250 mL are heated in a muffle furnace to 560° C. After the bottles are removed from the tempering furnace, they are each sprayed at a distance of about 55 cm with the test solution. For this purpose, the bottles are held at the neck and rotated at 60 rpm.

The spraying lasts about 4 seconds. The amount of coating material applied in each case is 4 mL. The solution to be applied is sprayed with a spray gun using compressed air at 3.5 bar.

After being coated, the bottles are immediately returned to the hot muffle furnace at 560° C. and cooled continuously over a period of 12 hours to ambient temperature.

DETERMINATION OF THE LAYER THICKNESS

The thickness of the tin(IV) oxide layers is determined with a HOT END COATING METER of the AGR Company. This method involves an infrared reflection measurement. The measurement is carried out from the bottom of the bottle at heights of 1, 1.5, 2 and 3 inches. At each height, the measuring instrument scans the whole circumference of the bottle and carries out a measurement at each degree (360 measurements/circumference).

COLD END COATING

To determine the adhesion of cold end coating agents, the coated bottles are sprayed with a 1:40 diluted solution of a cold end coating agents based on a polyethylene wax emulsion (commercially available under the name of TEGOGLAS-RP-40 TM). For this purpose, the bottles are heated to 120° C. and placed on a plate rotating at 30 rpm. By means of a spray gun (3.5 bar), 2 mL of the cold end coating solution are applied.

DETERMINATION OF THE SCRATCH RESISTANCE

Two identical, coated glass bottles are fastened in a holding device so as to be offset 90° to one another and rubbed against one another with a pressure of 5.5 bar on a 10 cm rubbing section. The number of lifts or strokes until scratching noises or scratches can be perceived acoustically and optically is a measure of the scratch protection of the cold end coating solution. The bottles are tested in the wet as well as in the dry state for scratch resistance.

WASHING LIQUID STABILITY

The resistance of the coatings is determined in a dishwasher (Miele-Desinfektor G 7736), which has been modified for this purpose. For this test, the bottles are washed for 10 minutes at 85° C. with a 2% sodium hydroxide solution.

HOT END COATING

| Solution | Film Thickness/CTU[1] Measurement Zone/Inches | | | |
|---|---|---|---|---|
| | 1 | 1.5 | 2 | 3 |
| 1 | 57 | 62 | 61 | 48 |
| 2 | 83 | 87 | 90 | 77 |
| 3 | 27 | 25 | 26 | 20 |
| 4 | 47 | 40 | 46 | 37 |
| 5 | 57 | 53 | 54 | 48 |
| 6 | 30 | 33 | 31 | 26 |
| 7 | 41 | 50 | 41 | 33 |

[1] 1 CTU = 0.3 nm

COLD END COATING

The bottles, coated with the test solutions 1 to 7, exhibit an excellent primer effect for the cold end coating agents. The cold end coating has a scratch resistance of more than 10 lifts or strokes. No reductions in scratch resistance is noted after two wash cycles in the sodium hydroxide solution.

We claim:

1. A preparation suitable for coating hot glass vessels to improve the exterior surface of the vessels, said preparation comprising a solution of the compound $(OH)_2SnCl_2$ in such an amount that the content of Sn in the solution is between about 0.45 to 4.5 moles/L.

2. The preparation of claim 1, wherein the solution also contains between about 0.01 to 0.5 mole of oxalic acid per mole of $(OH)_2SnCl_2$.

3. The preparation of claims 1 or 2, wherein the ratio of Sn to Cl in the solution is at least approximately equal to 1:1.

4. The preparation of claim 1, wherein the solution also comprises a compound of the formula $(HO)_xSn(C_2O_4)_y$, wherein x has a value of 0.2 to 3.8, y has a value of 1.9 to 0.1 and $(2y+x)=4$, the amount of $(HO)_xSn(C_2O_4)_y$ in the solution being such that it replaces equimolarly up to 50 mole% of the compound $(OH)_2SnCl_2$.

5. The preparation of claim 4, wherein the solution also contains between about 0.01 to 0.5 mole of oxalic acid per mole of $(OH)_2SnCl_2$.

6. The preparation of claims 1, 2 or 4, wherein the liquid phase of the solution is water, a mixture of lower aliphatic alcohols and water or ethanol.

* * * * *